(12) United States Patent
Jensen (10) Patent No.: US 6,536,739 B1
(45) Date of Patent: Mar. 25, 2003

(54) FLOW CONTROL DEVICE

(75) Inventor: Lynn E. Jensen, Clearfield, UT (US)

(73) Assignee: Fresenius USA, Inc., Lexington, MA (US)

( * ) Notice: Subject to any disclaimer, the term of this patent is extended or adjusted under 35 U.S.C. 154(b) by 0 days.

(21) Appl. No.: 10/004,519

(22) Filed: Nov. 1, 2001

(51) Int. Cl.⁷ .............................................. F16K 7/04
(52) U.S. Cl. .............................................. 251/6; 251/4
(58) Field of Search ........................................ 251/6, 4

(56) References Cited

U.S. PATENT DOCUMENTS

| | | | | |
|---|---|---|---|---|
| 3,685,787 A | * | 8/1972 | Adelberg | 251/6 |
| 3,802,463 A | * | 4/1974 | Dabney | 251/6 |
| 4,065,093 A | * | 12/1977 | Phillips | 251/6 |
| 4,320,889 A | * | 3/1982 | Genese | 251/6 |
| 4,911,399 A | * | 3/1990 | Green | 251/4 |
| 4,919,389 A | * | 4/1990 | Hoekwater et al. | 251/4 |
| 5,259,587 A | * | 11/1993 | D'Alessio et al. | 251/4 |
| 5,718,409 A | * | 2/1998 | Starchevich | 251/4 |

* cited by examiner

*Primary Examiner*—Henry C. Yuen
*Assistant Examiner*—John Bastianelli
(74) *Attorney, Agent, or Firm*—Gibson, Dunn & Crutcher LLP (57) ABSTRACT

An improved flow control device for regulating the flow of liquid or gas through a length of flexible-conduit using a generally enclosed rack and pinion assembly engaged by an external slidable assembly or switch. The case has a lower rack with a surface supporting a length of flexible conduit, opposing walls, and an upper surface. The lower rack has at least one rack track along which a pinion gear assembly may be engaged and rotated. The pinion gear assembly has a cylinder shaft capped on at least one end by a pinion gear with radiating teeth. The pinion gear assembly can be rotated along a portion of the flexible conduit, compressing it at one or more positions. Operation of the flow control device can be accomplished using a single hand, and the case remains enclosed without subjecting the pinion gear assembly to an external environment.

22 Claims, 6 Drawing Sheets

FIG. 10 FULLY CONSTRICTED

FIG. 9 PARTIALLY CONSTRICTED

FIG. 8 FULLY UNCONSTRICTED

FLOW CONTROL DEVICE

FIELD OF THE INVENTION

The present invention relates to the field of flow control devices and more particularly to a rack and pinion clamping system to regulate flow of fluid or gases in flexible conduits, e.g., medical tubing in extracorporeal dialysis procedures.

BACKGROUND OF THE INVENTION

Flexible conduits or tubing carrying liquids or gases are used presently in the medical and pharmaceutical industries, as well as in laboratory settings, the chemical industry, the ink and print industries, and for photographic development. These uses are aided by the ability to fixedly open and reliably close the flexible conduit, and in some cases to establish stable partial flow as well.

For instance, many modem medical procedures require the use of flexible tubing to Withdraw fluid from a patient, or to administer fluid to a patient, or to do both. Such procedures include intravenous feeding blood transfusions and blood processing, and both peritoneal dialysis and hemodialysis. Typically, a catheter is temporarily or semi-permanently implanted in the patient, where it is connected in some manner to the appropriate tubing set necessary for the procedure that is to be performed.

In hemodialysis, the patient's blood is cleansed by drawing it out of the patient though a catheter and passing it through an artificial kidney. Patients in hemodialysis treatment typically require treatment several times a week for several hours each time. In peritoneal dialysis, a peritoneal dialysis solution is infused into the patient's peritoneal cavity and allowed to reside there for a "dwell time" during which blood impurities diffuse through the peritoneal membrane into the dialysis solution. The dialysis solution with the collected impurities is then removed from the peritoneal cavity and discarded.

Many of these procedures require tubing that can be readily opened and closed, either by the medical practitioner or by the patient in the more ambulatory treatment protocols. For example, a peritoneal dialysis patient will often have a semi-permanent implanted catheter in the peritoneal cavity which extends to outside the patient. The exterior end may then be attached to a tubing segment which in turn is usually attached to a connector, perhaps to a bag of fluid for intake, or to a collection device. A reliable system for opening and closing such tubing is essential; a system that also allows for the controlled constriction of the tubing at less-than-fully-open settings would be a bonus.

Pinching and clamping devices are well known, and historically involved a butterfly or alligator clip placed manually along a clampable portion of the tubing or conduit. Rarely was this more than an opened versus closed setting, though certain screw-type clamps were devised to provide adjustable flow and control. These adjustable methods of flow control generally required two hands to apply or adjust, however; most such closure mechanisms are also small and slippery in conditions common in a surgical unit.

An improvement in these devices involved a roller or rolling cam placed in near proximity to the flexible conduit. This was accomplished by pressuring an intermediate constriction device, as in U.S. Pat. No. 4,335,866 (Bujan 1982), or by rolling an externally ribbed wheel or gear in a track, either by direct roller-clamp restriction of the conduit, as in U.S. Pat. No. 3,135,259 (Evans 1964), and U.S. Pat. No. 3,099,429 (Roman 1963), or by rotating a cam that oblated the conduit along its longitudinal line with a V-shaped wedge, as in U.S. Pat. No. 4,911,399 (Green 1990). This latter approach of necessity requires a supporting channel or groove to keep the conduit centered under the impending wedge.

In the operation of existing devices, the user faces a number of problems. Wherever the rolling wheel or clamping means is exposed to facilitate manual control (usually a forward-or-back thumb action along the barrel or case), body fluids or congealing debris can clog the opening, impairing use. Similar material can find its way onto the ribbed wheel, or the operator's thumb, and cause slippage. When the moveable clamp is other than fixed rigidly in a track over the conduit, lack of traction can keep the clamp from being moved into its fully constricted position. The ability to fix and hold one or more middle positions is difficult, if available at all. Moreover, in some of the existing devices, the conduit must be trapped in a channel to ensure that the rotating clamp can restrict it fully, a channel which often complicates the threading of the conduit through the barrel or body of the flow control device, and adds design expense and detail to the interior of the barrel or case.

SUMMARY OF THE INVENTION

The present invention is a flow control device for regulating flow of fluids or gases in flexible conduits, with particular but by no means exclusive application in intravenous delivery systems using flexible tubing, as well as peritoneal dialysis and hemodialysis tubing sets. The flow-control device of the present invention comprises a case or barrel which houses a rack and pinion system which can slidably restrict one or more flexible conduits in the case, from a fully opened to a fully constricted flow. Intermediate restrictive settings may be achieved by a plurality of pre-set engagements comprising a means to "click in" or flexibly and reversibly ratchet along the rack. The case is preferably closed (it could be designed to be waterproof), with manual or machine control of the constrictive settings via a means to slide or rotate the pinion gear assembly, accomplished in one embodiment by an external and ergonomically pleasing slide assembly with ribs or flanges in one embodiment, connecting into the case with an upper rack engaging an adjustable clamping means, preferably a pinion gear assembly comprising rotatable gears, capping the ends of a bisected cylinder shaft.

The present device generally comprises the following: a case or barrel assembly, a rack and pinion assembly interior to the case assembly, and a slidable means that can engage the clamping means of the pinion gear assembly against the flexible conduit. The parts of the invention may all be made by injection molding. The invention may be advantageously pre-assembled, as where the flexible conduit is affixed inside the case to a receiving connector, or threaded by a user through the passage provided in the case. In one embodiment, the case is capped at each end with a port or opening as part of the tubing throughway, said cap preferably comprising a replaceable end piece. In a preferred embodiment, the assembly is sufficiently flexible that it can be snapped together but pried apart by ordinary hand strength.

The case assembly of the invention contains a lower surface for supporting a length of flexible tubing; this surface should be flat or otherwise capable of resisting compression where the pinion gear assembly constricts the conduit. As shown in one embodiment, no guides to seat the conduit are needed along this lower surface so long as the tubing throughway is maintained medially to the teeth of the pinion gear assembly. In a further embodiment, the lower surface has tracks or bilateral gear racks integral to the lower surface; other embodiments may have a single or bilateral rack assembly inserted above the lower surface or otherwise projecting from the side walls.

Whenever by design the clamping face of the pinion gear assembly is unable to achieve a position fully constricting the tubing at some point inside the case, a ramp or other inflexible means may be added along the opposing portion of the lower surface to ensure constriction of the flexible conduit.

The case or barrel is further comprised of opposing side walls extending generally in the vertical plane from and along the longitudinal axis of the lower surface, but possibly cylindrically or irregularly so long as the rack and pinion assembly can readily engage the pinion gear assembly to reliably constrict the conduit therein. Each sidewall may be grooved or shelved or designed to receive the stable placement of either a rack or the axially projecting shafts of the pinion gear assembly, or both. The lower surface may also be used as the lower side of the rack as discussed above, in which case a groove is still provided for the projecting shafts of the pinion gear assembly to facilitate movement of the pinion gear assembly along the racks. The interior of the case should be open enough to allow a portion of flexible tubing to be fixed therein or threaded therethrough. Although the device may be applied at any flexible and clampable portion of the conduit, the embodiment shown in the drawings applies the constricting gear to a point of tubing very near to an end connector. This placement facilitates the clamping constriction, which otherwise may be improved by an opposing ramp opposite the clamping means of the pinion gear assembly to ensure full constriction at one or more points along the lower rack.

The invention further comprises a rack and pinion gear assembly, which when engaged applies an increasingly constrictive clamping means along the longitudinal axis of the lower surface and against the flexible conduit. The clamping means in one preferred embodiment comprises a pinion gear assembly, further comprising a longitudinally bisected cylinder capped at each end with pinion gears. This design facilitates threading of conduit when fully "open" while providing for simple open and closed positions and a full and smooth spectrum of intermediate constrictions; an array of other clamping means is known in the art. In this embodiment, the bisected cylinder shaft is integral to and of a smaller radius then the radius of the pinion gears on each end, thus simplifying manufacture of the pinion gear assembly and consuming less space inside the case than the ribbed wheel and projecting cams of the prior art.

In one embodiment, the rack and pinion assembly is designed with an upper and lower rack capturing the pinion gear assembly. As noted, the gear racks may be part of the case, or made part of inserts, or placed along the sidewalls, or optionally with one side wall rack and the other end of the pinion gear assembly shaft free to float forward and back in an open groove on the opposite side wall.

In an embodiment, the lower surface is designed with the gearing tracks of the lower rack on an insertion piece that snaps in just above an outer housing and acts as the lower surface and the lower part of the rack and pinion assembly. This insertion piece can also be designed with ridges or ramps medially bridging the space between the bilateral lower rack tracks to facilitate clamping of the flexible tubing.

One of many valuable improvements of the present invention is found in the upper portion of the rack and pinion assembly. Instead of the open channel design of the traditional rolling wheel and cam, the upper surface of the case in the present invention closes with the side walls. Like the lower rack or tracks, the upper rack can be made integral to the upper surface, or affixed along the upper portion of one or both side walls, or extended inward as part of the slidable assembly, so long as the upper rack slidably engages the pinion gear against the lower rack.

One useful embodiment of the upper surface and upper rack comprises an insertable, slidable assembly wherein the outermost and exposed surface of said assembly has non-skid protrusions or other ergonomically pleasing friction surfaces along its exposed face plate to facilitate thumb or finger control, the innermost surface of said assembly comprises the upper rack engaging the pinion gear assembly, and there is a spacer connecting said outermost surface to said innermost surface; it is this spacer that extends through the slot on top of the case. A well or notch is placed upon the spacer and communicates with one or both side walls and a plurality of opposing nibs thereon to allow for stable "snapping in" along the slidable assembly's continuum from the unconstricted to the fully constricted position. One skilled in the art can readily see that the nibs and notches could be reversed, with the nibs in the slidable assembly space and a plurality of notches along that line in the side wall or walls along the rack. Optionally the plurality of nibs could be placed under the slidable face plate and corresponding notches could be placed along the portion of the outer housing over which the face plate slides. Certain reversible ratchet systems may also be applied.

Another valuable improvement of the present invention involves the stable application of the pinion gear assembly along the upper and lower racks and against the conduit. By moving the slidable assembly linearly, the pinion gear assembly rotates toward and then in contact with the flexible conduit. By proper design, the fully open position is at one end of the rack and pinion assembly, with a means to limit sliding or rotation beyond this point. It is at this extended point that a nib can be placed in the sidewall for contact or "snap in" to the notch in the spacer.

By advancing the slidable assembly in the unobstructed direction, engaging the pinion gear assembly, the bisected cylinder of the pinion gear assembly should begin to engage and compress the flexible conduit, in a smooth fashion. Other cylinder shaft designs are known in the art that would apply an irregular radius to achieve the same ends. The nibs and notches of the sidewall and spacer can be designed and marked along this crimping path to provide preset intermediate and stable constriction zones. By continuing to advance the slidable assembly, full constriction of the conduit is achieved, and again a nib and notch can be placed appropriately to mark this far limit of pinion gear assembly rotation, and secure a fixed and "locked" position. Properly designed, this sliding mechanism, from open, to partially closed, to fully closed, should be robustly reusable and easily reversible. It is also fully operational by a patient using only one hand. More simply, toggle system or twist knob could be devised to provide the same open/partially constricted/closed sets.

The rack and pinion assembly is designed to be retained within the case. This can be accomplished with capping end pieces, or by affixing or molding the racks into the side walls, the upper and lower surfaces, or along the inserts, with raised barriers and/or ridges at either end of one or both of the racks to limit rotation of the pinion gear assembly, to a designated length of the conduit.

Optionally, the pinion gear assembly could be slid along a series of increasingly high ridges placed upon the lower surface, with the flexible conduit placed along the top of such ridges. Each ridge would constrict the conduit a different set amount, for example, one-fourth, one-half, three-fourths.

Operation of the flow control device, once fully assembled with the flexible conduit in the throughway, is straightforward, presumably using thumb control of the slidable assembly, with only one hand. Machine control could also be applied, perhaps via remote control or timer. Once use of the device is concluded, it can be unhooked and disassembled and cleaned for reuse, or the flexible tubing can be removed and new tubing rethreaded for new use, especially useful where no sterilization is required, such as where non-bodily fluid or reagents are used.

BRIEF DESCRIPTION OF THE DRAWINGS

For a more complete understanding of this invention, reference should be made to the embodiment illustrated in greater detail in the accompanying drawings described below by way of an example of the invention.

DETAILED DESCRIPTION OF THE INVENTION

Figure 1:
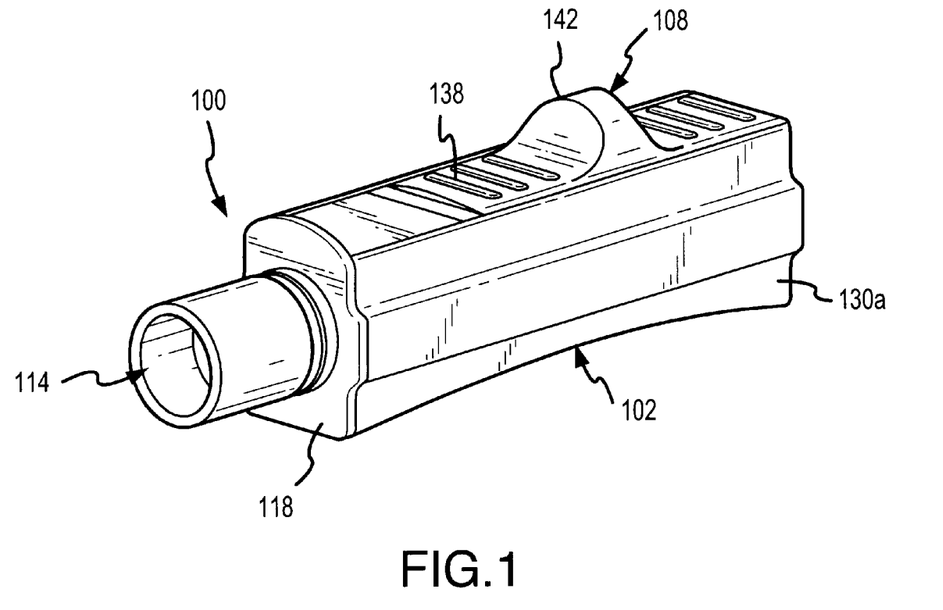
FIG. 1 is a perspective view of the flow control device of the present invention, showing one end cap with a port for the flexible tubing.

FIG. 1 shows the flow control device 100 of the present invention. The embodiment of the invention shown in the various drawings comprises several parts: A case 102, a rack and pinion assembly 104 which includes a pinion gear assembly 106, and a slidable assembly 108 with an attached interior upper rack 110 to engage the pinion gear assembly 106 against the rack tracks 122a and 122b on the lower rack 122. In one embodiment, the pinion gear assembly 106 comprises a longitudinally bisected cylinder shaft 124 capped on each end by pinion gears 107a and 107b, with gear teeth 128 and axial extension pins 134a and 134b. In operation, some portion of flexible conduit 112 is placed into or preassembled in the throughway of the case 102, via ports 114 and 116 found at each end cap 118 and 120. End caps 118 and 120 can be simple cap ends as shown, or can be tubing inserts or other commonly used connectors.

The slidable assembly 108, when moved linearly, will thereby slide its attached interior upper racks 110a and 110b (not visible, but located opposite 110a) to engage the pinion gear assembly 106 against the rack tracks 122a and 122b of the rack and pinion assembly 104. Although this upper rack 110 can be made with separate upper racks 110a and 110b on each edge to engage the dual pinion gears 107a and 107b, it is sometimes easier to design and mold this piece with ribs across the entire surface of upper rack 110. This also provides greater flexibility for the spacing apart of the pinion gears 107a and 107b on the pinion gear assembly 106.

Figure 3:
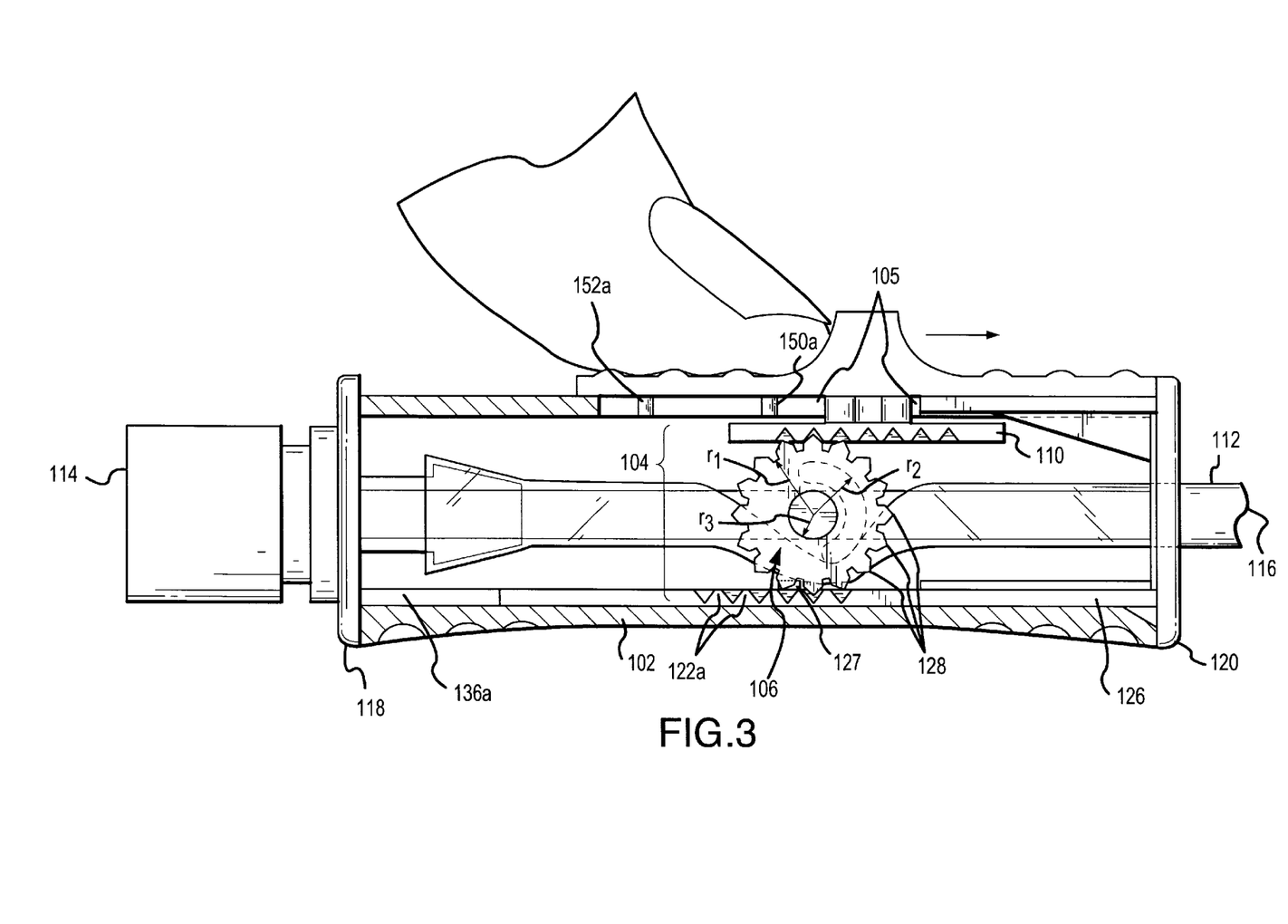
FIG. 3 is a sectional view of the flow control device in the closed position (conduit fully restricted).

As the pinion gear assembly 106 is rotatably advanced along rack tracks 122a and 122b, in one preferred embodiment the bisected cylinder shaft 124 medial to the pinion gears 107a and 107b engages with and then begins to constrict and clamp the flexible conduit 112. As the pinion gear assembly 106 continues to be rotated, the shaft eventually constricts fully the flexible conduit 112 as shown in FIG. 3.

Figure 2:
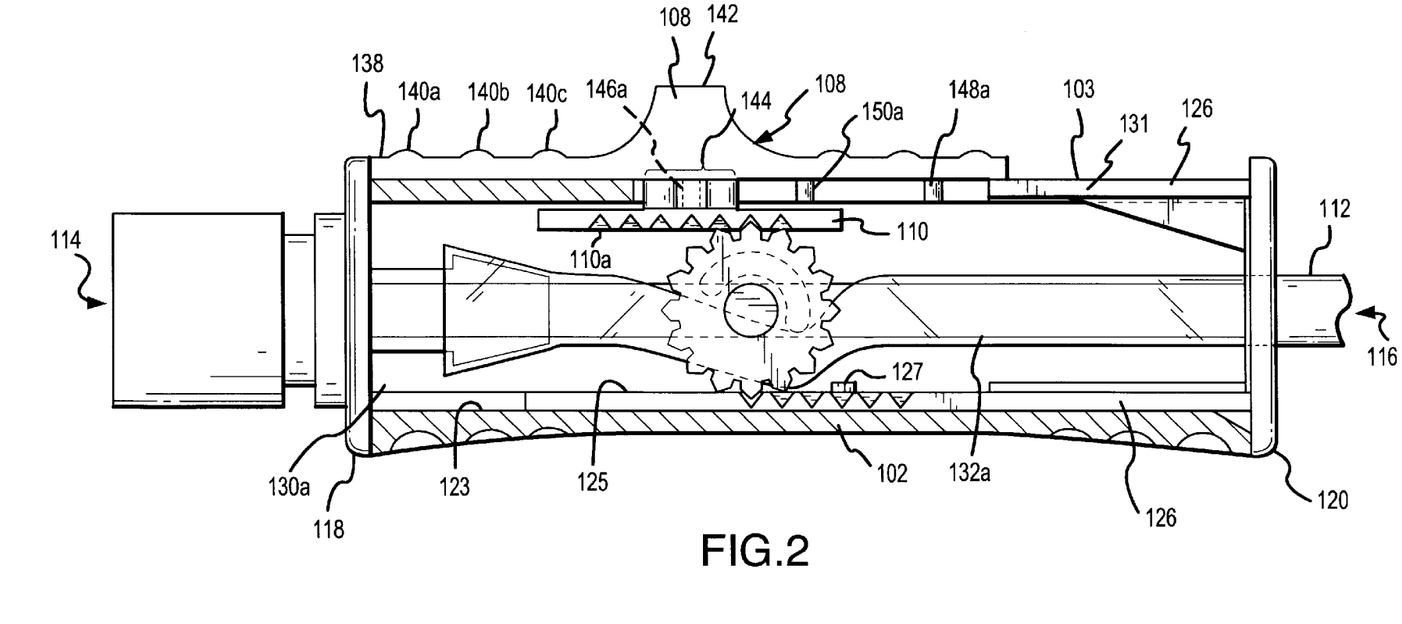
FIG. 2 is a sectional view of the flow control device in the open position (conduit unrestricted).

As shown in more detail in the sectional drawing of FIG. 2, the case 102 may simply act as a housing in which the operative parts of the invention are inserted: the rack and pinion assembly 104 comprising the insert 126, which may simply rest on the inside of the bottom surface 123 of the case 102; the pinion gear assembly 106 engaged with the rack tracks 122a and 122b which may be integrally designed into the face of the lower rack 122 of the insert 126 or anterior to the bottom surface 123 of the case 102; (ridge or ramp 127 on lower rack 122 aid in compressing the flexible conduit 112; the engaging upper rack 110 connected to and controlled by the slidable assembly 108, said slidable assembly 108 inserted through the slot 105 of the upper surface of case 102; and the enclosing end caps 118 and 120. The flexible conduit 112 is inserted into the throughway of the case 102 via ports 114 and 116, with the flexible conduit 112 retained fully medial to the gear teeth 128 as they engage the respective upper and lower racks 110 and 122 respectively. Threading is preferably done when the device is "open" and the bisected cylinder shaft 124 would not substantially impinge the flexible conduit 112 upon insertion, or before assembly of all components.

Figure 5A:
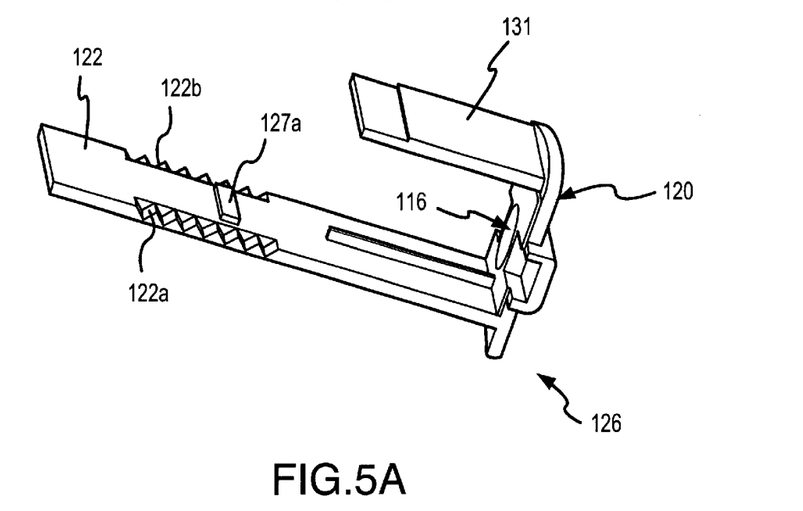
FIGS. 5A and 5B are a 45° view of the connectable insert, showing the bilateral racks of the lower surface and one step.
Figure 5B:
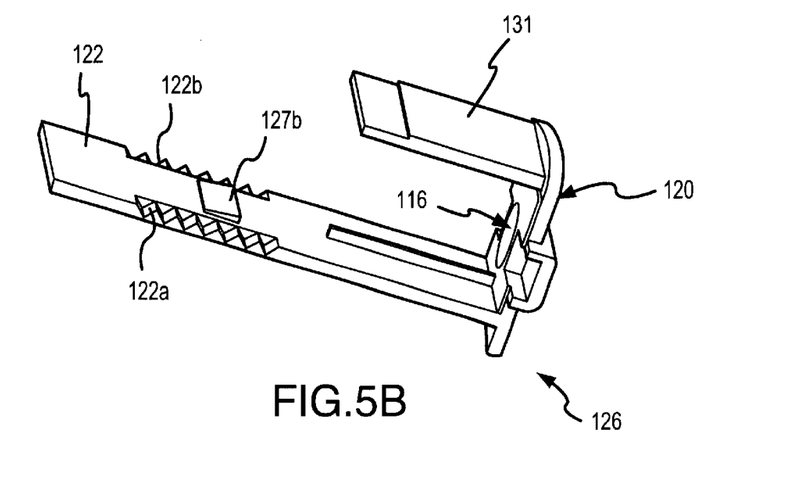

Insert 126 of one preferred embodiment (FIGS. 5A and 5B) comprises a lower rack 122, end cap 120 containing a port 116, and an upper sleeve 131. Insert 126 can be designed to snap into or otherwise be fixedly placed into case 102. The posterior surface of lower rack 122 may rest upon or be fixed above the bottom surface 123 of case 102. The anterior surface of lower rack 122 is designed to support the flexible conduit 112.

Lower rack 122 is designed with bilateral rack tracks 122a and 122b in the preferred embodiment, though only one set of tracks may be used. On the flat surface between rack tracks 122a and 122b may be placed a ridge 127a (FIG. 5A) or ramp 127b (FIG. 5B) to aid in compressing the flexible conduit 112. Further ridging or ramps can be designed into the lower rack 122 or elsewhere on the insert 126 to retain or limit rotation of the pinion gear assembly 106.

The case 102 further comprises opposing side walls 130a and 130b extending generally in the vertical plane from and along the longitudinal axis of the lower rack 122. In one embodiment, these side walls 130a and 130b (not visible but located opposite 130a) have guide grooves 132a and 132b (not visible but located opposite 132a) extending longitudinally along so much of the side walls 130a and 130b as necessary for the pinion gear assembly to be rotated from the fully unconstricted to the fully constricted position. The guide grooves 132a and 132b are designed to receive and keep in track the axial extension pins 134a and 134b extending axially and laterally from the pinion gear assembly 106; they also help retain and apply the force of the rotating pinion gear assembly. The side walls 130a and 130b can also be grooved to receive the lower rack 122 of insert 126, or shelves or ribs can be placed along the sidewalls to facilitate gluing or other affixing thereon of lower rack 122 and its rack tracks 122a and 122b.

FIG. 2 shows one preferred embodiment wherein both side walls 130a and 130b have guide grooves 132a and 132b for the axial extension pins 134a and 134b of the pinion gear assembly 106. A snapping or connecting means can also be designed along insert 126 for fixed placement into the case 102.

The case 102 has a topmost surface 103 which joins to the side walls 130a and 130b and can be ultrasonically welded. A slot 105 is provided in the face of the topmost surface 103 to allow for back-and-forth movement of the slidable assembly 108. The end caps 118 and 120 complete the case 102.

Figure 4:
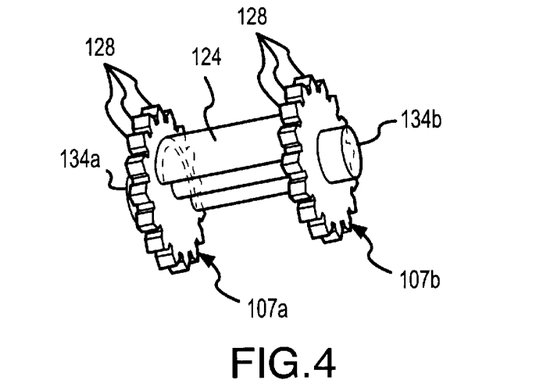
FIG. 4 is a 45° view of one preferred embodiment of the pinion gear assembly.

The pinion gear assembly 106 is featured in FIG. 4 and is comprised of a longitudinally bisected cylinder shaft 124 capped on each end by pinion gears 107a and 107b, out of which axially project axial extension pins 134a and 134b. Other means to retain the bisected cylinder shaft 124 in operational engagement with the flexible conduit 112 are known in the art. This pinion gear assembly 106 is placed into the case 102 such that the gear teeth 128 are engaged with the lower rack 122 and the upper rack 110. The pinion gear assembly 106 is rotated by the movement of one or both of the upper rack 110 or the lower rack 122 engaging the gear teeth 128 of the pinion gears 107a and 107b. As noted earlier, only one pinion gear 107a is required for this configuration, in which case an axial extension pin 134b would be engaged in the guide groove 132b, and some means provided to retain the flexible conduit 112 beneath the bisected cylinder shaft 124.

Properly assembled, the pinion gear assembly 106 is rotated within the upper and lower racks 110 and 122 such that the bisected cylinder shaft 124 is not constricting the flexible conduit 112 at one position of rotation, and fully constricts the flexible conduit 112 at another position.

Figure 6:
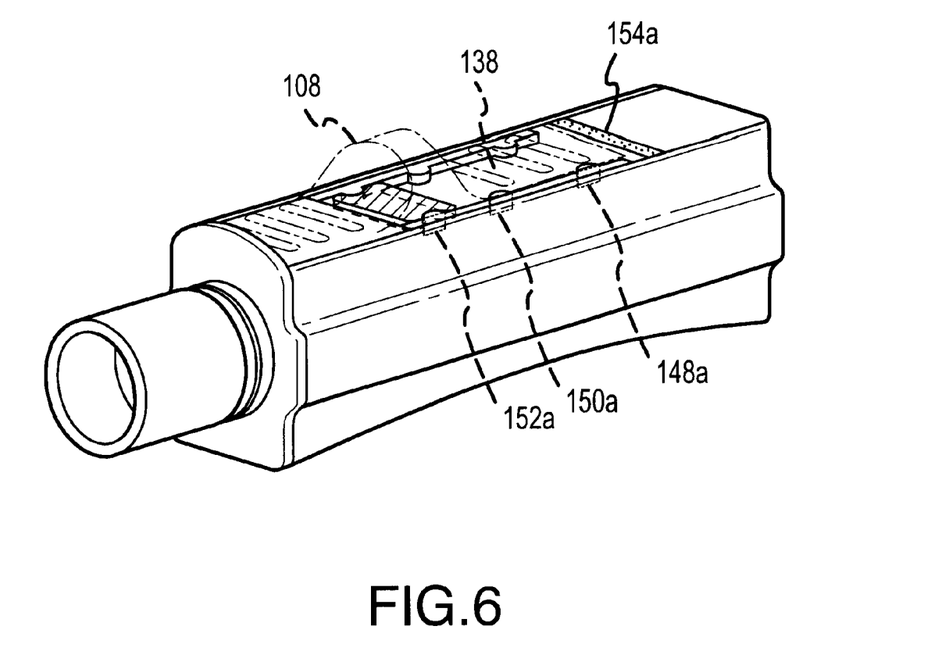
FIG. 6 is a top view of the slidable assembly, with a plurality of nibs shown and with the engaging notch of one side of the spacer showing in phantom at one extension of the slidable assembly.
Figure 7:
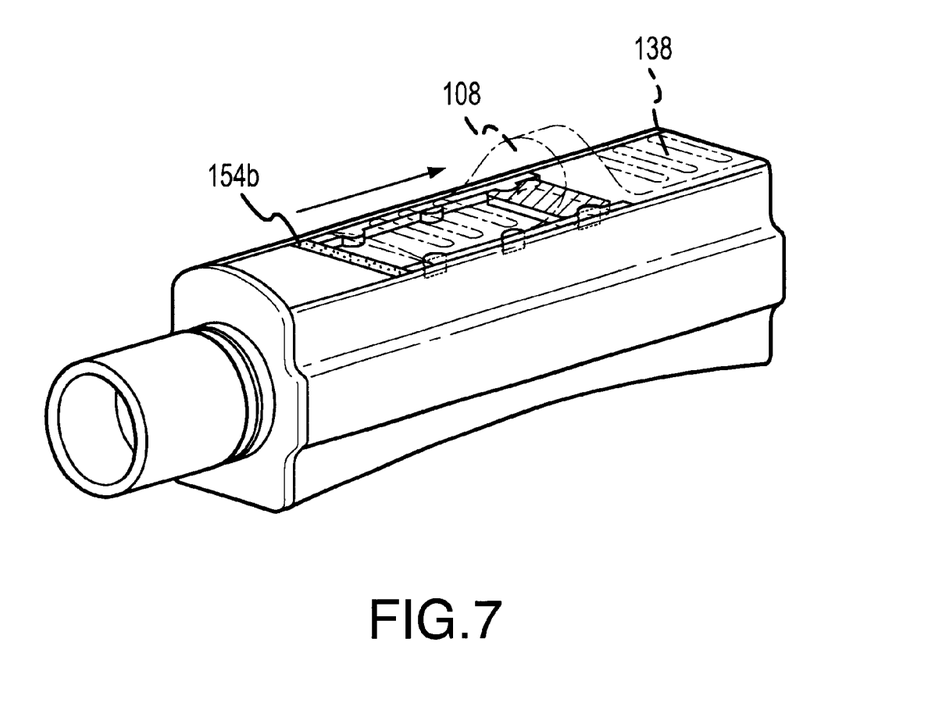
FIG. 7 is a top view of the slidable assembly, with a plurality of nibs shown and with the engaging notch of one side of the spacer showing in phantom at the opposite extension of the slidable assembly.

The slidable assembly 108 is comprised in this embodiment of an outermost surface or face plate 138 that is covered with raised surfaces 140a, 140b, and 140c, preferably made of a non-skid surface to improve grip and friction, and a crown 142 ergonomically designed for easy finger movement back and forth along the longitudinal direction of the face plate 138. Other reliable faces may be considered, as well as an alternative using a toggle switch or a twist knob (not shown). Posterior to face plate 138 a spacer 144 is provided. This spacer 144 extends anteriorly from the face plate 138 and need be only large enough and strong enough to support upper rack 110 connected at the distal end of spacer 144, such that upper rack 110 faces its gear receiving tracks into case 102 and opposite rack tracks 122a and 122b of lower surface 125. The spacer 144 also may contain a well or notch 146a and 146b (not visible but located opposite 146a) on either or both of sides of spacer 144 facing each side wall 130a and 130b. It is at the level of the notches 146a and 146b that corresponding nibs 148a and 148b, 150a and 150b, and 152a and 150b (148b, 150b, and 152b are not visible but located opposite nibs 148a, 150a, and 152a respectively), and others if desired, are projecting from the respective side walls 130a and 130b. In addition seats 136a and 136b (not visible but located opposite 136a) in the side walls 130a and 130b are shown engaged by lower rack 122 of insert 126. Of course, the nib and notch placement may be reversed. Other means for marking or seating progression alignments of the slidable assembly are known in the art.

Upper rack 110 need be only so long as required to fully rotate the pinion gear assembly 106 from the fully unrestricted position of FIG. 2 to the fully restricted position of FIG. 3. Upper rack 110 can be ridged full across, or contain separate tracks along each longitudinal edge, or along only one such edge.

The radius of the pinion gears 107a and 107b to the base of the gear teeth 128 is designated as $r_1$. The radius of the bisected cylinder shaft 124 is designated $r_2$, and in one preferable embodiment $r_2$ is less then $r_1$, to facilitate the rotation of the pinion gears 107a and 107b and compression of the flexible conduit 112. A skilled artisan will also see that a cylinder shaft of irregular radius could readily be designed to achieve an effective constriction of the conduit. Alternative embodiments could also be designed whereby $r_1$ is smaller than $r_2$, as where small pinion gears are applied to a compressing shaft of larger radius, requiring a means to retain flexible conduit 112 beneath bisected cylinder shaft 124. The axial extension pins 134a and 134b have a defined diameter $d_1$, which is just smaller than the vertical span of the guide grooves 132a and 132b, to facilitate tracking of said pins along said groove.

FIG. 6 and FIG. 7 show respectively in phantom relief face plate 138 of slidable assembly 108 in the fully unconstricted and the fully constricted settings of the device. In addition, one embodiment may have markings 154a and 154b placed upon face plate 138 to indicate the open and the closed position, respectively. In one embodiment, marking 154a is a green bar or closed circle, and marking 154b is a red bar or closed circle.

Figure 8:
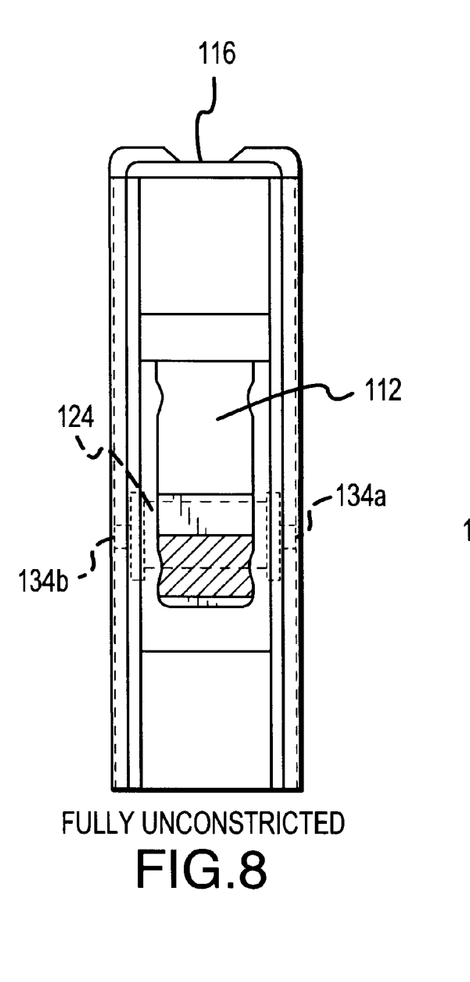
FIGS. 8, 9, 10 are top views of the face plate of the slidable assembly showing in phantom the axial pins tracking along the grooved guides of the opposing sidewalls.
Figure 9:
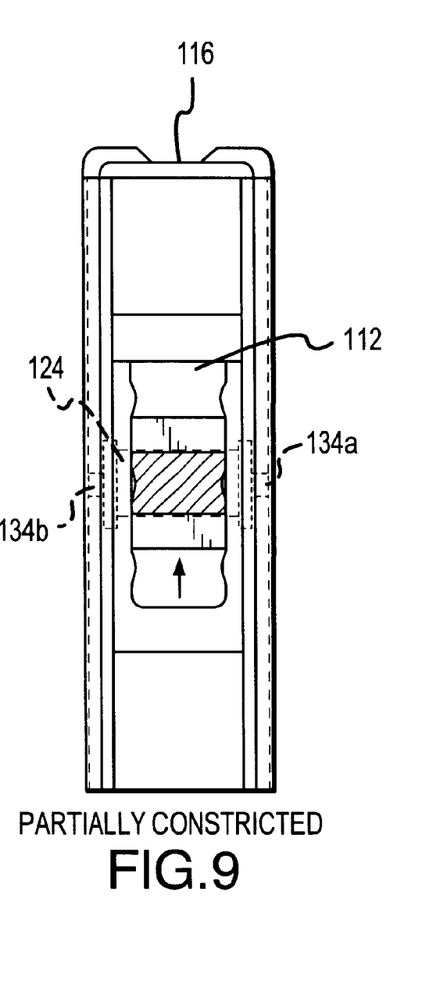
Figure 10:
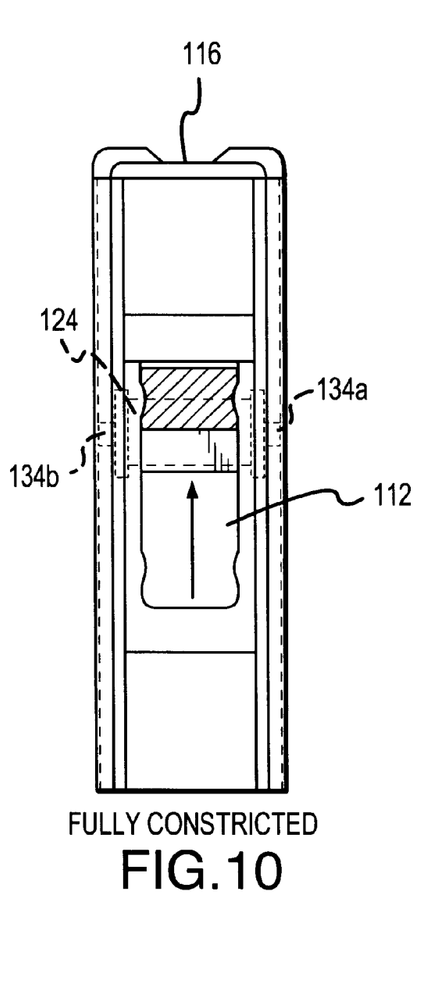

FIGS. 8, 9, and 10 show, respectively, a topmost view of the device, illustrating in phantom the progressive rotation of bisected cylinder shaft 124 and axial extension pins 134a and 134b from a fully unconstricted (FIG. 8), to a partially restricted (FIG. 9), to a fully constricted position (FIG. 10) of flexible conduit 112.

I claim:

1. A flow-control device for regulating flow through a length of flexible conduit situated therethrough, comprising:
    (a) a case assembly comprising:
        (1) a lower rack having a surface for supporting a length of flexible conduit, said surface including at least one rack track extending along a longitudinal axis therealong;
        (2) a first and second opposing side walls joined to said lower rack;
        (3) a topmost surface joined to said first and second side walls opposite said lower rack, said topmost surface having a longitudinal slot therein; wherein said lower surface, said opposing side walls, and said topmost surface form a passage for the conduit therethrough; and
        (4) a first and second connecting end cap, each containing an open port for the flexible conduit to pass therethrough and said first connecting end cap enclosing a first open end of said case assembly and said second connecting end cap enclosing a second open end of said case assembly;
    (b) a pinion gear assembly comprising a cylinder shaft capped on at least one end by a pinion gear with radiating teeth; wherein said pinion gear assembly is placed inside of said case and engages at least one rack track; and (c) a slidable assembly comprising
  (1) an outermost surface serving as a face plate,
  (2) a spacer extending anteriorly therefrom, and
  (3) an upper rack connected to said spacer, wherein said slidable assembly is located such that said face plate is exterior to said topmost surface, said spacer extends through said slot, and said upper rack faces at least one rack track at a spacing range that facilitates operational engagement with said pinion gear against at least one rack track.

2. The flow-control device of claim 1 wherein the operational rotation of said pinion gear assembly along said rack track extends said cylinder shaft into said passage and against the flexible conduit and variably crimping said conduit.

3. The flow-control device of claim 1 wherein said lower surface comprises a ramp centered along said longitudinal axis and medial to at least said rack track such that operatively rotating said pinion gear assembly along at least one said rack track increasingly crimps the flexible conduit against said ramp.

4. The flow-control device of claim 1 wherein said surface includes at least one ridge at a point along said longitudinal axis corresponding to the furthest operative rotation of said cylinder shaft.

5. The flow-control device of claim 1 wherein said cylinder shaft is of an irregular radius.

6. The flow-control device of claim 1 wherein said cylinder shaft is bisected longitudinally.

7. The flow-control device of claim 1 wherein said cylinder shaft, for at least one position of rotation of the pinion gear assembly, does not come into operational engagement with the flexible conduit.

8. The flow-control device of claim 1 wherein said cylinder shaft, for at least one position of rotation of the pinion gear assembly, extends into said passage for the flexible conduit and into operational engagement with said flexible conduit in such a way that the flow in said conduit is partially restricted.

9. The flow-control device of claim 1 wherein said cylinder shaft, for at least one position of rotation of the pinion gear assembly, extends into said passage for the flexible conduit and into operational engagement with said flexible conduit in such a way that the flow in said conduit is fully constricted.

10. The flow-control device of claim 1 wherein said case assembly is made up of at least two connectable pieces.

11. The flow-control device of claim 10 wherein one of said connectable pieces comprises a lower rack and one of said end posts, wherein the surface of said lower rack contains at least one rack track parallel to the longitudinal axis such that said rack track, when assembled in said case, will receive a pinion gear of said pinion gear assembly.

12. The flow-control device of claim 1 wherein said pinion gear assembly comprises a cylinder shaft capped at each end by a pinion gear.

13. The flow-control device of claim 12 wherein a lateral pin projects axially from each pinion gear.

14. The flow-control device of claim 12 wherein said lower surface is molded with bilateral rack tracks longitudinally parallel along the distal face of said lower surface such that the teeth of the pinion gears operatively engage said rack tracks.

15. The flow-control device of claim 14 wherein said opposing side walls contain guide grooves along the longitudinal plane such that each axial pin of said pinion gears is tracked and guided along the full length of operational rotation of the pinion gear assembly.

16. The flow-control device of claim 14 wherein the portion of said slidable assembly that operatively engages said bilateral pinion gears is a bilateral rack extending longitudinally along said passage and so long as necessary to allow for the length of operational rotation of the pinion gear assembly.

17. The flow-control device of claim 1 wherein said outermost surface comprises a non-skid surface.

18. The flow-control device of claim 1 wherein said outermost surface comprises a plurality of raised surfaces or ridges and at least one crown.

19. The flow-control device of claim 1 wherein said slidable assembly is operatively engaged by a toggle switch.

20. The flow-control device of claim 1 wherein said slidable assembly is operatively engaged by use of a twist knob.

21. The flow-control device of claim 1 wherein at least one side edge of said spacer contains a notch and wherein at least one nib protrudes from the upper interior sidewall facing said notch, such that the nib seats into said notch in at least one operational position of the slidable assembly.

22. The flow-control device of claim 21 wherein said operational positions are calibrated and preset to reflect fully unrestricted, half restricted, and fully restricted flow levels of the flexible conduit during operation of the slidable assembly.

* * * * *